Patented Apr. 27, 1943

2,317,868

UNITED STATES PATENT OFFICE 2,317,868

POLYMERIZATION OF ISOBUTYLENE CONTAINING MATERIAL AT LOW TEMPERATURES

Luther B. Turner, Roselle Park, N. J., assignor, by mesne assignments, to Jasco, Incorporated, a corporation of Louisiana No Drawing. Application April 27, 1940, Serial No. 331,939

2 Claims. (Cl. 260—93)

This invention relates to high molecular weight polymer substances such as polyisobutylene and to polymers of other olefins, either with or without copolymerized diolefinic components; relates particularly to means for stabilizing the high molecular weight polymer against deterioration during storage, against the effects of heat and mechanical working and other treatments at normal or high temperatures; and relates especially to processes for including a protective agent in the polymer during the polymerization reaction.

High molecular weight polymers, and especially the solid, rubber-like, polymers of isobutylene are common articles of commerce at the present time and have been found to have a great many commercial and technical uses. Difficulty has been encountered, however, in maintaining the molecular weight at or near its original high value during processing which must follow the polymerization. The polymer is found to be relatively easily disintegrated, or depolymerized, or broken down in molecular weight by such influences as heat and mechanical working, especially mechanical working at elevated temperatures such as from 100° C. to 200° C. or higher. Also difficulty is encountered during storage of the polymeric substances, especially storage in warm warehouses since the polymer appears to depolymerize to a substantial extent during storage resulting in a lower molecular weight material than was originally produced, and desired.

Various substances have been proposed to prevent or minimize the breakdown resulting from heat, storage, and milling, including such substances as tertiary amyl phenol sulfide and various of its metal derivatives and various forms including varying proportions of sulfur; and elemental sulfur in the form of flowers of sulfur. Of these several compounds the tertiary amyl phenol sulfide and its various metal derivatives are unsatisfactory when the polymer is to be mixed with various compounding agents, and the tertiary amyl phenol sulfide is especially objectionable in mixtures with rubber, under which circumstances the tertiary amyl phenol sulfide exerts a very harmful influence upon the rubber. Sulfur, however, is not subject to this objection, and when present in the proportion of from 0.01% to 3% or 4%, it is a valuable and important constituent of the polymer substance.

However, in the past it has been considered necessary to prepare the polymer at the appropriate low temperature such as —40° C. to —78° C. or —100° C., and wash and dry the polymer by a variety of milling and processing treatments and then mill in the sulfur in the form of flowers of sulfur or similar fine dispersion. However, the operations of washing and drying the polymer, especially when conducted on a roll mill or in a kneader, and the milling in of the sulfur produces an unavoidable and highly undesirable reduction in molecular weight of the polymer substance, since the washing and drying necessitate relatively long-continued mechanical working, and the addition of the sulfur required working at a relatively high temperature in order to obtain an adequate dispersion of the sulfur in the polymer.

The present invention avoids the mechanical working and heating and the concomitant loss of molecular weight by producing the polymer directly in the presence of finely dispersed sulfur particles; and this has been found to be possible without loss of molecular weight in the polymerization reaction, and in spite of the fact that sulfur containing compounds in general are highly poisonous and harmful to the polymerization reaction to the point where it has previously been considered to be a primary requirement that all sulfur containing substances must be removed from the polymerization reactants with the greatest care.

Accordingly, the invention consists in preparing a mixture of polymerizable olefins together with a refrigerant and a polymerization catalyst, and with an appropriate proportion of elemental sulfur, preferably in fine state of division; conducting the polymerization reaction at low temperature to precipitate the polymer upon and with the sulfur particles to produce a polymer with occluded sulfur and to remove the sulfur containing polymer from the reactants with sufficient sulfur present in the polymer to provide the desired protective effect upon the molecular weight and to maintain the desired physical characteristics of the polymer.

Thus an object of the invention is to polymerize an olefin-containing mixture at low temperature in the presence of sulfur by the application to a cooled olefinic mixture containing the sulfur of a Friedel-Crafts type catalyst. Other objects and details of the invention will be apparent from the following description.

In practicing the invention, a polymerization mixture is prepared containing preferably isobutylene together with a refrigerant such as solid carbon dioxide or a diluent-refrigerant such as liquid ethylene, liquid propane, liquid ethane or methane or mixtures thereof or a diluent such as the alkyl halides. The isobutylene is desirably present in the proportion of 100 parts with from 250 to 500 parts of the diluent-refrigerant or an excess of solid carbon dioxide, and from 0.01 part to 3 or 4 parts of flowers of sulfur in as fine a state of division as is conveniently possible. To the polymerization mixture at the low temperature as set at about −78° C. by the solid carbon dioxide, or as set at about −98° C. to −100° C. by the liquid ethylene, a suitable polymerization catalyst is added. The catalyst may conveniently be gaseous boron trifluoride. The polymerization reaction proceeds quickly to yield a polymer containing the flowers of sulfur dispersed and occluded in the solid polymer, the polymer having a molecular weight ranging from about 20,000 to 350,000 or higher, according to the lowness of the temperature, the purity of the reactants and the quantity of the catalyst.

Alternatively, aluminum chloride dissolved in ethyl chloride or methyl chloride or carbon disulfide may be used as the catalyst, or various of the other analogous metal or metalloid halides in solution may be used as the catalyst, preferably by spraying the catalyst solution onto the surface of the rapidly stirred polymerization mixture.

Alternatively, mixed olefins may be used as the polymerization reactants such as a mixture of isobutylene and a diolefin such as butadiene, isoprene, dimethyl butadiene, pentadiene, etc. in the proportion of from 70 parts of isobutylene to 30 parts of diolefin up to 99½ parts of isobutylene with one-half part of diolefin, the proportion being governed by the particular diolefin chosen and by the desired characteristics of the resulting interpolymer.

Example 1

A mixture of 100 parts of isobutylene was prepared in a cooled reaction chamber, together with an excess of solid carbon dioxide, and approximately one part of flowers of sulfur. Into this mixture there was passed approximately 3 parts by weight of gaseous boron trifluoride. The polymerization reaction proceeded quickly and was substantially complete within a period of approximately six to ten minutes, about three-quarters of the isobutylene present being polymerized into a white rubber-like plastic polymer, approximately three-quarters of the flowers of sulfur being likewise occluded in the mass of solid polymer. The solid polymer was removed from the reaction chamber, warmed up to room temperature and tested for molecular weight, which was found to be approximately 80,000. This molecular weight is substantially the same as is obtainable by the same reaction mixture and conditions in the absence of the flowers of sulfur, showing that practically no harmful effect is exerted by the presence of the flowers of sulfur in the reaction mix.

It is essential of course that the flowers of sulfur be substantially pure, free from acidic bodies, free from metal salts, and free from organic compounds, especially oxygenated organic compounds or substances which form complex salts with the boron trifluoride catalyst.

The resulting polymer was then washed and dried by kneading in a Werner & Pfleiderer type of kneader. After a period of four hours of kneading at a temperature of 100° C., the molecular weight was found to be still approximately 70,000 to 75,000.

Another sample of the polymer as prepared in Example 1 was placed in the kneader and compounded with paraffin wax by heating the kneader and polymer to a temperature of approximately 100° C., and adding the paraffin wax in small quantities at the beginning and progressively larger quantities as more and more paraffin was taken up by the polymer, until an equal weight of paraffin had been combined with the polymer, producing a solution of the polymer in molten paraffin. This compound was then cooled, dissolved in light naphtha, the polymer precipitated by the addition of butyl alcohol, redissolved in tetralin and the molecular weight determined in the tetralin solution by the Staudinger method and found to have a molecular weight of approximately 70,000.

The incorporation of other substances including heavy mineral oil and various solid pigments and fillers is similarly accomplished with only a similar small loss in molecular weight.

Polymeric material containing polymerized isobutylene prepared without the sulfur and given similar treatments may have its molecular weight reduced to half or below of the original value, and even the kneading required to incorporate the sulfur into the polymer may result in a loss of from one-fifth to one-third of the original molecular weight.

Example 2

A mixture of 100 parts of isobutylene was prepared with 350 parts of liquid ethylene, 1 part of flowers of sulfur, and treated with approximately 5 parts of a solution of aluminum chloride in methyl chloride as catalyst, the catalyst being sprayed upon the surface of the rapidly stirred olefin mixture. As in Example 1, the polymerization proceeded rapidly to produce the desired polymer, containing dispersed and occluded therein, the desired proportion of elemental sulfur. This material, because of the more powerful catalyst and the lower polymerization temperatures had a molecular weight of approximately 300,000. Upon kneading as before, the molecular weight was reduced by the kneading operation to a value of approximately 225,000 to 250,000, whereas polymer produced without the sulfur upon receiving a similar kneading treatment had its molecular weight reduced to 100,000 or below. This material likewise is readily compounded with hot paraffin wax, heavy lubricating oil, or solid fillers with only a similar minor loss of molecular weight.

Example 3

A mixture of 80 parts of isobutylene, 20 parts of butadiene, 350 parts of liquid ethylene, and 3 parts of flowers of sulfur was prepared in a reaction container and treated with a catalyst as before described. The catalyst used was a cooled solution of aluminum chloride in methyl chloride which was sprayed on to the surface of the rapidly stirred olefinic mixture. The polymerization reaction occurred quickly and was quenched when between two-thirds and three-quarters of the olefinic mixture was polymerized, by the addition to the reaction mixture of approximately 50 parts of propyl alcohol. The solid polymer containing the major portion of the flowers of sulfur was then removed from the reactor, brought up to room temperature and its molecular weight determined by the Staudinger method. The molecular weight was found to be approximately 70,000. The resulting interpolymer is capable of being cured by a heat treatment in the presence of a sulfurization aid such as Tuads (tetramethyl thiuram disulfide) at approximately 155° C. for thirty minutes to produce a rubber-like substance having a high tensile strength ranging from 2,000 pounds to 4,500 pounds per square inch, an elongation of 900 to 1200%, a high flexure resistance and a high abrasion resistance.

All of these polymeric substances prepared as above described may be stored at room temperature for periods of weeks or months with substantially no measurable loss in molecular weight. All of these polymers may be milled for the periods of time necessary to incorporate the various compounding ingredients with a much less loss of molecular weight than is possible with a sulfur-free polymer, and all of the polymers as above prepared avoid the loss of molecular weight which otherwise occurs during the incorporation of the protective sulfur into the completed polymer.

In the preparation of the interpolymer above described in Example 3 and the subsequent processing, it is, under some conditions, desirable to apply to the polymer a very drastic milling treatment of the type produced by the Banbury mixer to overcome any tendency on the part of the polymer to blister during the curing operation or to produce flaws and discontinuities in the cured polymer. The presence of the sulfur during this Banbury treatment is highly advantageous in maintaining the molecular weight, an undesirable portion of which is otherwise lost by the Banbury treatment. Furthermore, the curing operation is greatly facilitated by compounding the interpolymer with small proportions of zinc oxide, stearic acid, and Tuads (tetramethyl thiuram disulfide). These materials are incorporated or compounded into the polymer by a milling operation either upon the open roll mill, in the Banbury mixer, or in a Werner & Pfleiderer kneader. In any of these or other analogous mills and milling operations, the presence of the sulfur as incorporated in the polymerization procedure preserves nearly the original molecular weight and avoids the otherwise serious loss of molecular weight inherent and unavoidable in the processing of the sulfur-free polymer as originally prepared.

The above outlined examples show only the inclusion of elemental sulfur in the polymer during the polymerization, but the procedure is not necessarily limited to sulfur, since various of the other desirable fillers may also be incorporated by similar procedures. Thus inert fillers such as china clay, whiting, lithopone, etc. are readily prepared in suspension in the polymerization mixture, with the sulfur if desired, or in the absence of sulfur, and the polymerization reaction incorporates and occludes the inert fillers into the polymer in the same way as it does the sulfur. Alternatively, in some instances it is desirable to incorporate paraffin wax into the polymer. While paraffin wax is somewhat soluble in many of the hydrocarbons, the solubility in mixtures of liquefied isobutylene and ethylene is comparatively low. Also at the polymerization temperatures whether the polymerization is conducted with solid carbon dioxide as refrigerant, or with liquid ethylene as refrigerant, the paraffin is quite hard and is readily prepared in the form of a dispersion of fine particles in the polymerization mixture which are readily incorporated into the polymer during the polymerization reaction. The paraffin may be included alone under these conditions, or both paraffin or sulfur may be included, or paraffin, sulfur and the various inert fillers may be incorporated into the polymer simultaneously during the polymerization reaction.

Other members of the sulfur group, such as selenium and tellurium are likewise readily incorporated, and when so incorporated, they serve many valuable purposes. It may be noted that only those substances can be incorporated into the polymer during the polymerization reaction, which are inert with respect to the catalyst and to the reactants. This fact prevents the incorporation of alkaline or acidic bodies, and prevents the incorporation particularly of the higher alcohols and especially organic acids which are reactive at the polymerization temperature. In some instances substances which tend to occlude or absorb some of the catalyst may be utilized if a suitably greater amount of catalyst is added to the reactants, to replace catalyst removed from the sphere of reaction by occlusion, but in most instances this is undesirable.

Thus the invention consists in the polymerization of a cooled olefinic material by the application thereto of a Friedel-Crafts type catalyst in the presence of elemental sulfur or other inert filler, to incorporate the sulfur or other inert filler into the polymer during the polymerization procedure, and thereby reducing the subsequent loss of molecular weight in the course of milling operations for the compounding of the polymer.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. In a polymerization process for the polymerization of isobutylene-containing material at low temperatures ranging between −40 and −100° C., the steps comprising mixing with the isobutylene-containing material flowers of sulfur and thereafter polymerizing the mixture by the application thereto of a solution of aluminum chloride in an alkyl halide.

2. In a process for the polymerization of mixtures of an isoolefin and a diolefin at temperatures ranging between −40 and −100° C., the steps of adding flowers of sulfur to the isoolefin-diolefin mixture at the low temperature, and thereafter polymerizing the mixture by the application thereto of a solution of aluminum chloride in ethyl chloride.

LUTHER B. TURNER.